(12) United States Patent
Hsu et al.

(10) Patent No.: US 7,212,418 B1
(45) Date of Patent: May 1, 2007

(54) SYNCHRONOUS RECTIFIER CONTROL CIRCUIT

(75) Inventors: Da-Jing Hsu, Sijhih (TW); Yun-Kang Zhu, Sijhih (TW)

(73) Assignee: Niko Semiconductor Co., Ltd. (TW)

( * ) Notice: Subject to any disclaimer, the term of this patent is extended or adjusted under 35 U.S.C. 154(b) by 0 days.

(21) Appl. No.: 11/266,684

(22) Filed: Nov. 2, 2005

(51) Int. Cl.
*H02H 7/125* (2006.01)
*H02M 3/335* (2006.01)

(52) U.S. Cl. .................. 363/53; 363/21.06; 363/127

(58) Field of Classification Search ............. 363/21.04, 363/21.06, 21.14, 84, 89, 125, 127, 52, 53, 363/56.1, 56.11
See application file for complete search history.

(56) References Cited

U.S. PATENT DOCUMENTS 6,026,005 A * 2/2000 Abdoulin ................. 363/89
6,535,400 B2 * 3/2003 Bridge .................. 363/21.06
6,594,161 B2 * 7/2003 Jansen et al. ............ 363/21.14

\* cited by examiner

*Primary Examiner*—Gary L Laxton
(74) *Attorney, Agent, or Firm*—Schmeiser, Olsen & Watts (57) ABSTRACT

A synchronous rectifier control circuit improves energy conversion efficiency and uses a signal produced by a secondary winding of a transformer in a rectifier circuit to control a low-impedance and a low power consuming current switch such as a JFET and a MOSFET in a synchronous rectifier circuit to substitute a high power consuming diode rectification and appropriately rectify and extend the ON time of the current switch to prevent the positive and negative phases of the current switch to be turned on simultaneously, which will cause a large current to burn the current switch. The invention includes a protection circuit having an under voltage lock out circuit for an interrupt output function, so that if an insufficient instant power voltage occurs, the power is turned on or off to interrupt all outputs and force the current switch of the rectifier circuit to turn off, and prevent the output of an unstable working voltage of the rectifier control circuit or the abnormal operation of the current switch.

19 Claims, 5 Drawing Sheets

SYNCHRONOUS RECTIFIER CONTROL CIRCUIT

FIELD OF THE INVENTION

The present invention relates to a synchronous rectifier control circuit, and more particularly to a rectifier control circuit capable of controlling the pause time of a secondary output current switch of a transformer and improving the energy conversion efficiency.

BACKGROUND OF THE INVENTION

As the operations of internal components of most electronic appliances (such as television, stereo, computer, etc) require the use of a direct current power supply, and thus a rectifier is needed to convert the alternate current power into a direct current power of various different voltages and maximize the functions of these electronic appliances. The rectifier can be divided into a linear rectifier and a switching rectifier according to different circuit structures, and the simple linear rectifier is consisted of a transformer, a diode, and a capacitor filter, and its advantages include simple circuit, high stability, quick responses to pause, high reliability, small ripple, and small electromagnetic interference. Since the linear rectifier adopts a low-frequency silicon steel transformer, therefore the linear rectifier has the shortcomings of large volume, heavy weight, low conversion efficiency (approximately 30% to 50%) and incapability of having a direct current input. To overcome the shortcomings of the linear rectifier, a switching rectifier is introduced. The switching rectifier has the advantages of high conversion efficiency, small power consumption for idle runs, light, and capability of having a direct current input, etc. Therefore, the current power supply market still uses the switching rectifier as the mainstream product. To cope with various different output powers, the following topologies for the rectifier circuits are developed for the switching rectifier, and these topologies include flyback, forward, full bridge, half bridge, and push-pull, etc.

Figure 1:
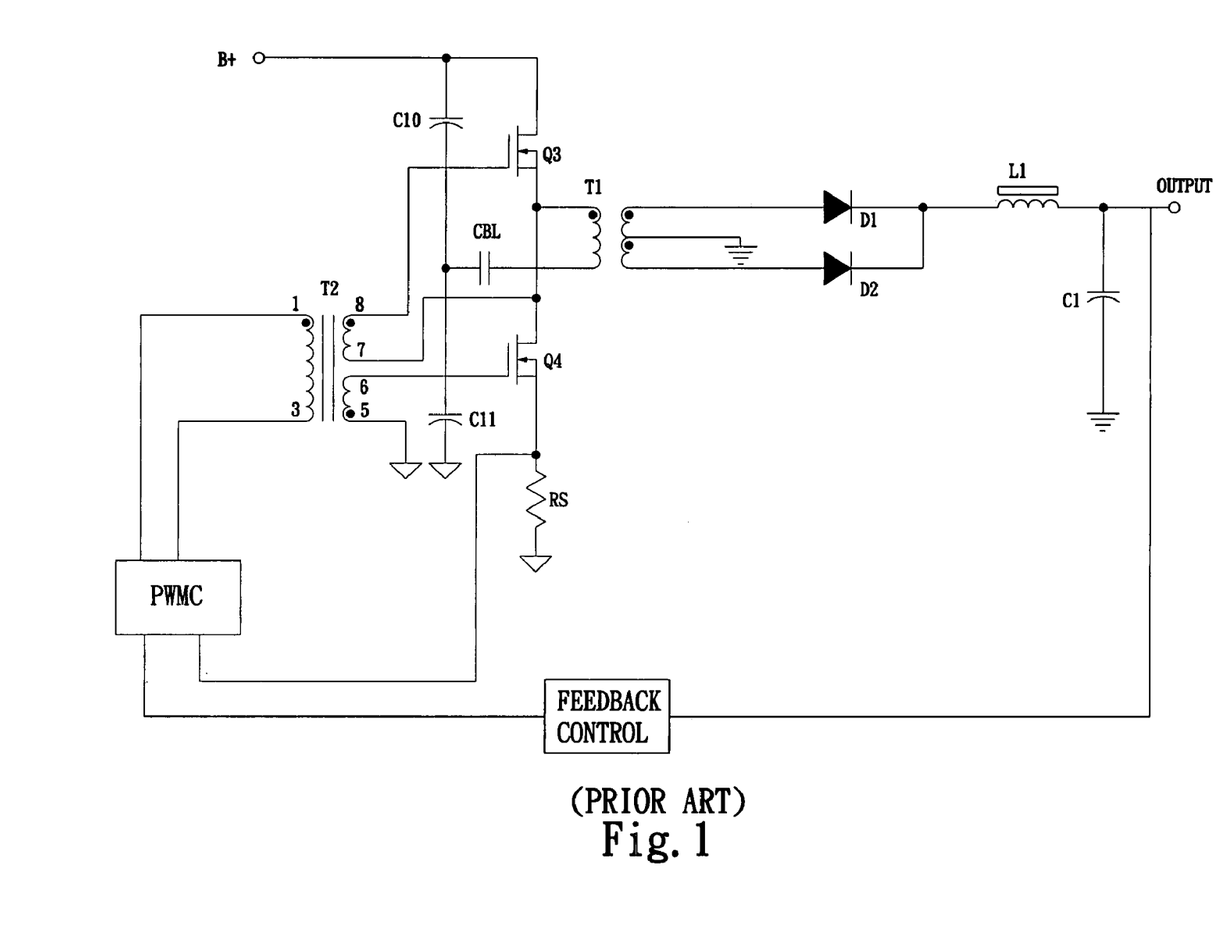
FIG. 1 is a schematic diagram of a prior art half-bridge circuit.

Referring to FIG. 1 for the schematic view of a prior art half-bridge circuit, the half-bridge circuit comprises a main transformer T1, a power terminal B+ of a direct current power supply connected to a preamble circuit, a pulse width modulation controller (PWMC), an isolation driven transformer T2, a DC isolation capacitor CBL, two input filter capacitors C10, C11, a current detection resistor RS, two current switches Q3, Q4, two output rectification diodes D1, D2 installed at the secondary winding of the main transformer T1, an energy storage inductor L1, an output filter capacitor C1, and a feedback control circuit Feedback-Control that feeds the signal of the output terminal OUTPUT back to the pulse width modulation controller PWMC. In the foregoing half-bridge circuit, the two current switches Q3, Q4 are N-channel field effect transistors, and the pulse width modulation controller PWMC produces a high/low pulse voltage level control signal to open/close the two current switches Q3, Q4 through an isolation driven transformer T2. The dots shown in all figures indicate the positive half cycle of the control signal corresponding to the polarity of each winding inductor voltage. In the positive half cycle, the control signal from the isolation driven transformer T2 maintains the current switch Q3 in the ON status and the current switch Q4 in the OFF status; in the negative half cycle, the control signal from the isolation driven transformer T2 maintains the current switch Q4 in the ON status and the current switch Q3 in the OFF status. For the operations of a half-bridge circuit, it is very important not to open the two current switches Q3, Q4 at the same time to avoid excessive current passing through and burning the current switches. To assure that this principle is followed, the pulse width modulation controller PWMC will close the two current switches Q3, Q4 simultaneously by the control signal within a short time between the positive half cycle and the negative half cycle, and this period of time is called the fly wheeling time. The outputted energy within the fly wheeling time is released by an energy storage inductor L1 and rectified by a diode D1, D2 circuit for the power supply. From the description above, the overall output rectifier circuit must pass through the rectifier diode D1 or D2 regardless of being in a positive/negative half cycle or a fly wheeling time, and the voltage of the rectifier diode will be dropped approximately to 0.4~1.0V. Therefore, there will be a large energy loss for a large current output. The prior art full-bridge circuit is operated by the method similar to the foregoing half-bridge circuit, except that the primary winding uses four current switches, and thus the output power is twice as much as that of the half-bridge circuit. However, the arrangement of the secondary winding is identical to that of the half-bridge circuit.

SUMMARY OF THE INVENTION

Therefore, it is a primary objective of the present invention to provide a synchronous rectifier control circuit to overcome the shortcoming of having a low energy conversion efficiency for the aforementioned prior art rectifier circuit, and to improve the energy conversion efficiency. The invention uses the signal produced by the secondary winding of a transformer to control the low impedance and low power consuming current switch such as a junction field effect transistor (JFET) or a metal oxide semiconductor field effect transistor (MOSFET) to substitute the prior art high power consuming diode rectification, and appropriately rectify and extend the ON time of the current switch, and also prevent the positive and negative phases of the current switch to be turned on at the same time, which will cause an excessively large current to burn the current switch. Thus, the invention can improve the energy conversion efficiency of the rectifier circuit. In addition, a synchronous rectifier control circuit of the invention includes a protection circuit that provides an under voltage lock out circuit interrupt output function, so that if an insufficient instant power voltage occurs when the power is turned on or off to interrupt all outputs and force the current switch of the rectifier circuit to turn off and prevent the rectifier control circuit to output an unstable working voltage or cause abnormal operations of the current switch.

To achieve the foregoing objectives and functions, a synchronous rectifier control circuit of the invention comprises an input unit for inputting a first input signal and a second input signal from a first input terminal and a second input terminal respectively and producing a first trigger signal and a second trigger signal; a delay unit for producing a first delay signal and a second delay signal according to the first trigger signal and the second trigger signal respectively; a switch signal unit for producing at least one switch signal to control at least one current switch, and one cycle of each switch signal includes a pause period, and the pause period starts when an instant pulse of the first trigger signal or the second trigger signal is sent to the switch signal unit, and the pause period ends when the next instant pulse of the first delay signal or the second delay signal is sent to the switch signal unit, and each switch signal turns off its controlled current switch in the pause period; and a power supply unit for providing the operating power supply of the switch signal unit and outputting at least one reference voltage.

DETAILED DESCRIPTION OF THE PREFERRED EMBODIMENTS

Figure 2:
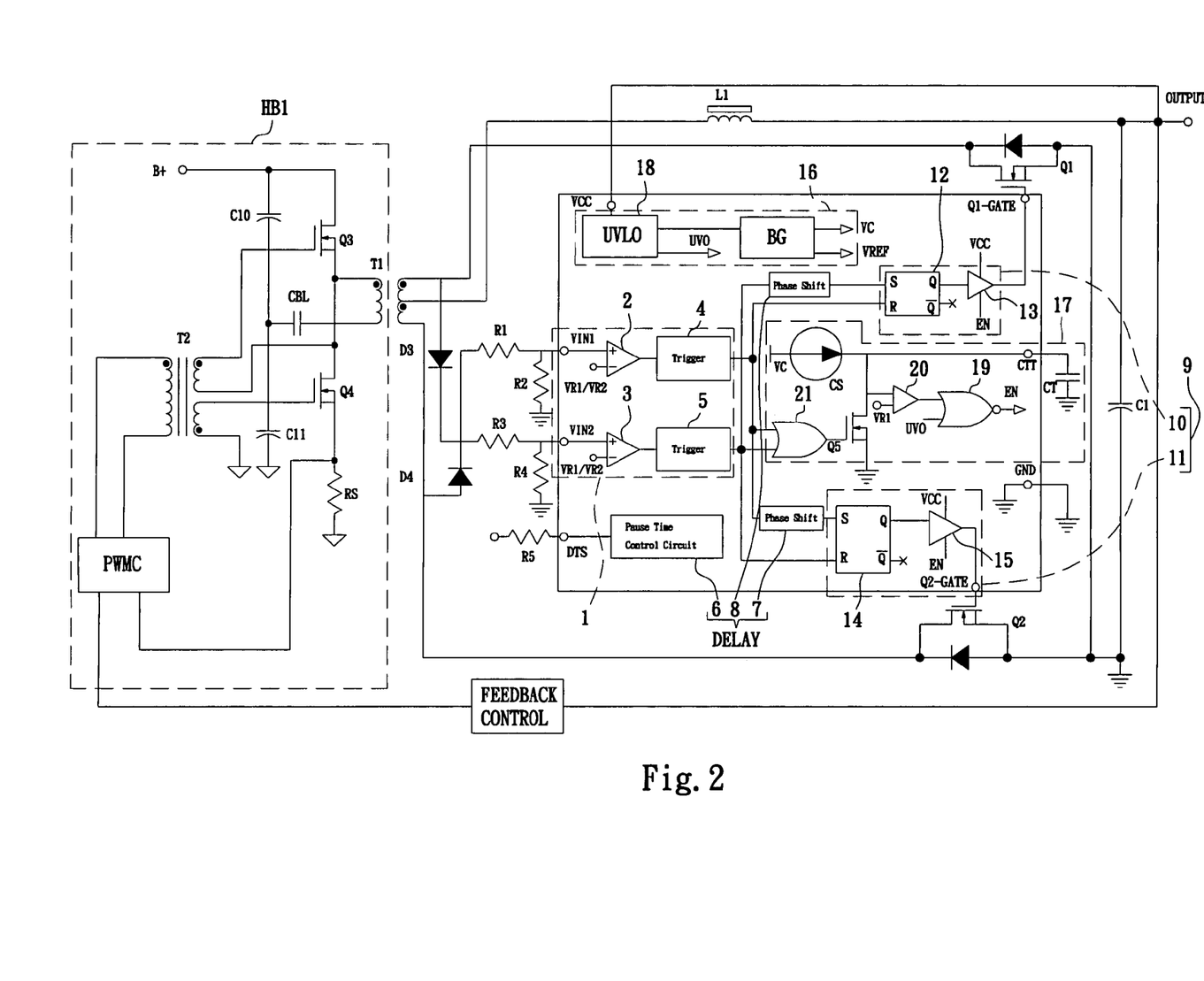
FIG. 2 is a schematic diagram of a synchronous rectifier control circuit used in a half-bridge circuit according to a first preferred embodiment of the present invention.

Referring to FIG. 2 for a schematic diagram of a rectifier control circuit used in a half-bridge circuit according to a preferred embodiment of the present invention, the half-bridge circuit installs a primary half-bridge circuit HB1 as shown in FIG. 1 at the primary winding of the main transformer T1, and the secondary winding of the primary transformer T1 uses a first current switch Q1 and a second current switch Q2 to substitute the two rectifier diode D2, D1, and the rest are identical to the secondary half-bridge circuit as shown in FIG. 1. In FIG. 2, the secondary winding of the main transformer T1 of the half-bridge circuit produces an input signal of a synchronous rectifier control circuit of the present invention. After the signal passes through the diode D3, D4, the voltage divider resistors R3, R4 and R1, R2 connected in series with each other produces a first input signal VIN1 and a second input signal VIN2.

In FIG. 2, a synchronous rectifier control circuit of the invention comprises an input unit 1, a first limit voltage comparator 2 of a first input terminal, a second limit voltage comparator 3 of a second input terminal 3, a first trigger 4 and a second trigger 5, and the input unit 1 inputs the first input signal VIN1 and the second input signal VIN2 from the first input terminal and the second input terminal respectively, and the first limit voltage comparator 2 and the second limit voltage comparator 3 compare a maximum reference voltage VR1 and a minimum reference voltage VR2 of the first input signal VIN1 and the second input signal VIN2 respectively. A high potential will be produced if the signal exceeds the maximum reference voltage VR1, and a low potential will be produced if the signal falls below the minimum reference voltage VR2, and the first trigger 4 and the second trigger 5 use the first limit voltage comparator 2 and the second limit voltage comparator 3 to output signals respectively. After the signals are produced, the minimum of the falling edge triggered first trigger signal and second trigger signal are produced, and the maximum reference voltage VR1 could be 2.5 volts or have other voltage values. The minimum reference voltage VR2 could be 0.8 volt or have other voltage values, and the first trigger 4 and the second trigger 5 can produce the first trigger signal and the second trigger signal of a falling edge triggered signal; a delay unit DELAY further comprises a pause time control circuit 6, a first phase shifter 7, and a second phase shifter 8 of a pause time control terminal DTS, and the first phase shifter 7 and the second phase shifter 8 inputs the first trigger signal and the second trigger signal respectively, and outputs a first delay signal and a second delay signal, and the control of the pause time control circuit 6 controls the pulse trigger interval of a pulse time for the first trigger signal/second trigger signal and the first delay signal/second delay signal. The pause time is changed by the pause time control terminal DTS and the pause time control circuit 6. For example, the pause time control terminal DTS is grounded or connected to a power voltage VCC/GND through a resistor R5, and the pause time are 100 ns/200 ns/300 ns, and a switch signal unit 9 is capable of separately producing two switch signals of two current switches, and the switch signal unit further comprises a first switch section 10 and a second switch section 11, and the first switch section 10 includes a first flip-flop 12 and a first gate driver 13, and the second switch section 11 includes a second flip-flop 14 and a second gate driver 15, and the first flip-flop 12 inputs a first trigger signal and a first delay signal. The first gate driver 13 outputs a first switch signal of the two switch signals, and the second flip-flop 14 inputs a second trigger signal and a second delay signal, and the second gate driver 15 outputs a second switch signal of the two switch signals, wherein the cycle of each of the two switch signals includes a pause period. More specifically, the pause period of the first switch signal starts when an instant pulse of the first trigger signal is sent to an input terminal R of the first flip-flop 12 and ends when the second delay signal produces a next instant pulse to be sent to an input terminal S of the second flip-flop 14 of the second switch section 11. The pause period of the second switch signal starts when an instant pulse of the second trigger signal is sent to an input terminal R of the second flip-flop 14 of the second switch section 11 and ends when the second delay signal produces an instant pulse to be sent to an input terminal S of the first flip-flop 12 of the first switch section 10, so that each switch signal turns off its controlled current switch within the pause period. In this preferred embodiment, the current switches refer to the first current switch Q1 and the second current switch Q2 in the half-bridge circuit, and the pause period of each switch signal is variable. Since the pause time is changed by the foregoing pause period control terminal DTS and the pause time control circuit 6. A power supply unit 16 provides the operating power VCC for the switch signal unit and provides a reference voltage VREF, which includes the maximum reference voltage VR1 and the minimum reference voltage VR2 outputted to the first limit voltage comparator 2 and the second limit voltage comparator 3 in the input unit 1.

In FIG. 2, a rectifier control circuit of the present invention further comprises an abnormal frequency protection circuit 17 for controlling the switch Q5 to compulsorily discharge the timing capacitor according to the first trigger signal and the second trigger signal, and the maximum reference voltage VR1 (which is generally 2.5 volt) and the voltage of the timing capacitor are compared so that the comparator 20 outputs a high potential or a low potential, and the voltage of the timing capacitor CT is lower than the maximum reference voltage VR1 for the normal operating frequency, and the output burst mode occurs at a light load discontinuous current mode of operation, so that the voltage of the timing capacitor CT is higher than the maximum reference voltage VR1, and the comparator 20 outputs the result and the under voltage lock out signal UVO outputs an enable signal through a NOR gate 19 to interrupt or enable the output of the switch signal unit. More specifically, the under voltage lock out protection circuit 18 of the power supply unit includes an under voltage lock out signal UVO outputted to the abnormal frequency protection circuit 17, and the abnormal frequency protection circuit 17 outputs the enable signal EN according to the under voltage lock out signal UVO. More specifically, the power supply unit 16 of a synchronous rectifier control circuit of the present invention further comprises an under voltage lock out protection circuit (UVLO) 18 for outputting the under voltage lock out signal UVO, and the under voltage lock out signal UVO is high when the output of the operating power VCC is low such as a preset voltage of 7 volt. Therefore, if the output of the operating voltage VCC is lower than the preset voltage, the under voltage lock out signal UVO passed through a NOR gate 19 of the protection circuit 17 changes the high potential enable signal EN to a low potential and thus turns off the output of the gate drivers 13, 15 and compulsorily turns off the output of the first current switch Q1 and the second current switch Q2 from the first switch section 10 and the second switch section 11.

In a synchronous rectifier control circuit of the present invention, the abnormal frequency protection circuit 17 can prevent the occurrence of reverse conduction produced by an irregular frequency (burst mode) under the very light load or no load condition. The power supply unit 16 further comprises a band gap (BG) for outputting the reference voltage VREF and a timing charged voltage VC and providing a stable current source CS charged by the timing capacitor CT of the protection circuit 17, and the stable current source CS provides a stable current of 40 microamperes to charge the timing capacitor CT, and the non-ground CTT of the timing capacitor CT is discharged when a control switch is electrically connected. If the burst mode occurs, and the voltage of the non-ground CTT charged by the timing capacitor exceeds a default value which is determined by the maximum reference voltage VR1 (such as 2.5 volts), and the voltage of the non-ground CTT exceeds the maximum reference voltage VR1, then the comparator 20 outputs a low potential enable signal EN through the NOR gate 19 to compulsorily turns off the output of the first current switch Q1 and the second current switch Q2 controlled by the first switch section 10 and the second switch section 11 until the next pulse of the first trigger signal or the second trigger signal from the input unit 1 is produced, and an OR gate 21 electrically connects the control switch Q5 and discharges the timing capacitor CT. The voltage of the non-ground CTT is dropped below the maximum reference voltage VR1, and the comparator 20 outputs a low potential. The NOR gate 19 restores the high potential for the enable signal and compulsorily turns off the output. Depending on the capacitance of the timing capacitor CT, the capacitance of the timing capacitor CT at normal frequency is 1.2×10E-5/fosc, wherein fosc indicates the normal frequency. Under the operation of a normal frequency, the voltage of the non-ground CTT sawtooth wave is lower than the maximum reference voltage VR1, and thus the enable signal is a high potential, and the protection circuit 17 will not force to turn off the outputs of the first current switch Q1 and the second current switch Q2.

Figure 3:
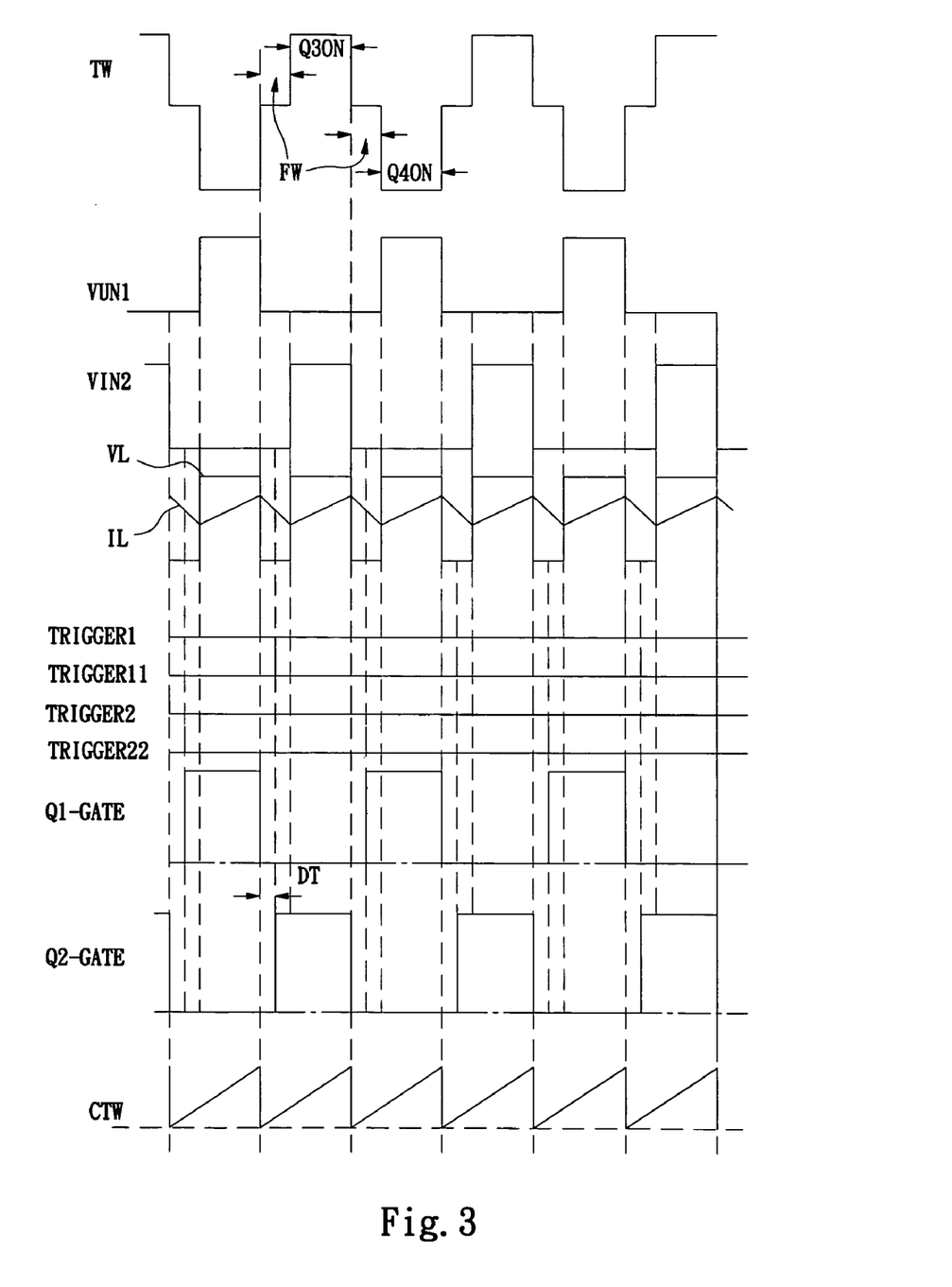
FIG. 3 is a waveform diagram of a synchronous rectifier control circuit when operated according to the present invention.

Refer to FIG. 3 for the schematic view of the waveform of a rectifier control circuit of the present invention. In the half-bridge circuit of the rectifier control circuit of the invention as shown in FIG. 2, the induced voltage TW of the secondary winding of the main transformer T1 is used to produce the first input signal VIN1 and the second input signal VIN2, wherein a fly wheeling time FW occurs during the ON time Q3ON of the current switch Q3 and the ON time Q4ON of the current switch Q4 in the waveform of the induced voltage TW. The first input signal VIN1 and the second input signal VIN2 passes through the input unit 1 to produce a first trigger signal TRIGGER1 and a second trigger signal TRIGGER2, and passes through a delay unit DELAY to produce a first delay signal and a second delay signal (not shown in the figure) and input the first trigger signal TRIGGER1, second trigger signal TRIGGER2, first delay signal TRIGGER11, and second delay signal TRIGGER22 into the switch signal unit 9 to produce a first switch signal Q1-GATE and a second switch signal Q2-GATE. The cycle of each switch signal Q1-GATE, Q2-GATE includes a pause period DT. More specifically, the pause period DT of the first switch signal Q1-GATE starts when an instant pulse is sent from the first trigger signal TRIGGER1 to an input terminal R of the first flip-flop 12 of the first switch section 10, and the timing starts when the first trigger signal TRIGGER1 simultaneously triggers a delay circuit of the second phase shifter 8. The timing ends when the second delay signal TRIGGER22 produces an instant pulse to be sent to the input terminal S of the second flip-flop 14 of the second switch section 11. The pause time of the second switch signal Q2-GATE starts when an instant pulse in the second trigger signal TRIGGER2 is sent to an input terminal R of the second flip-flop 14 of the second switch section 11, and the timing starts when the second trigger signal TRIGGER2 simultaneously triggers a delay circuit of a first phase shifter 7. The timing ends when the first delay signal TRIGGER11 produces an instant pulse to be sent to an input terminal S of the first flip-flop 12 of the first switch section 10, so that each switch signal turns off its controlled current switch Q1, Q2 in the pause period. In a normal operation, the enable signal is at a high potential, and the voltage waveform and current waveform inputted to the energy storage inductor L1 are indicated by VL, IL. Under the normal operating frequency, the non-ground CTT voltage waveform of the timing capacitor CT in the protection circuit 17 is indicated by CTW. It is worth to note that a pause period DT exists to prevent both current switches Q1, Q2 from being turned on at the same time, and the pause period DT adjusted by the delay unit DELAY is shorter than the fly wheeling time FW. Therefore, the effective operating time of the opened current switch Q1, Q2 can be increased to improve the energy conversion efficiency.

Figure 4:
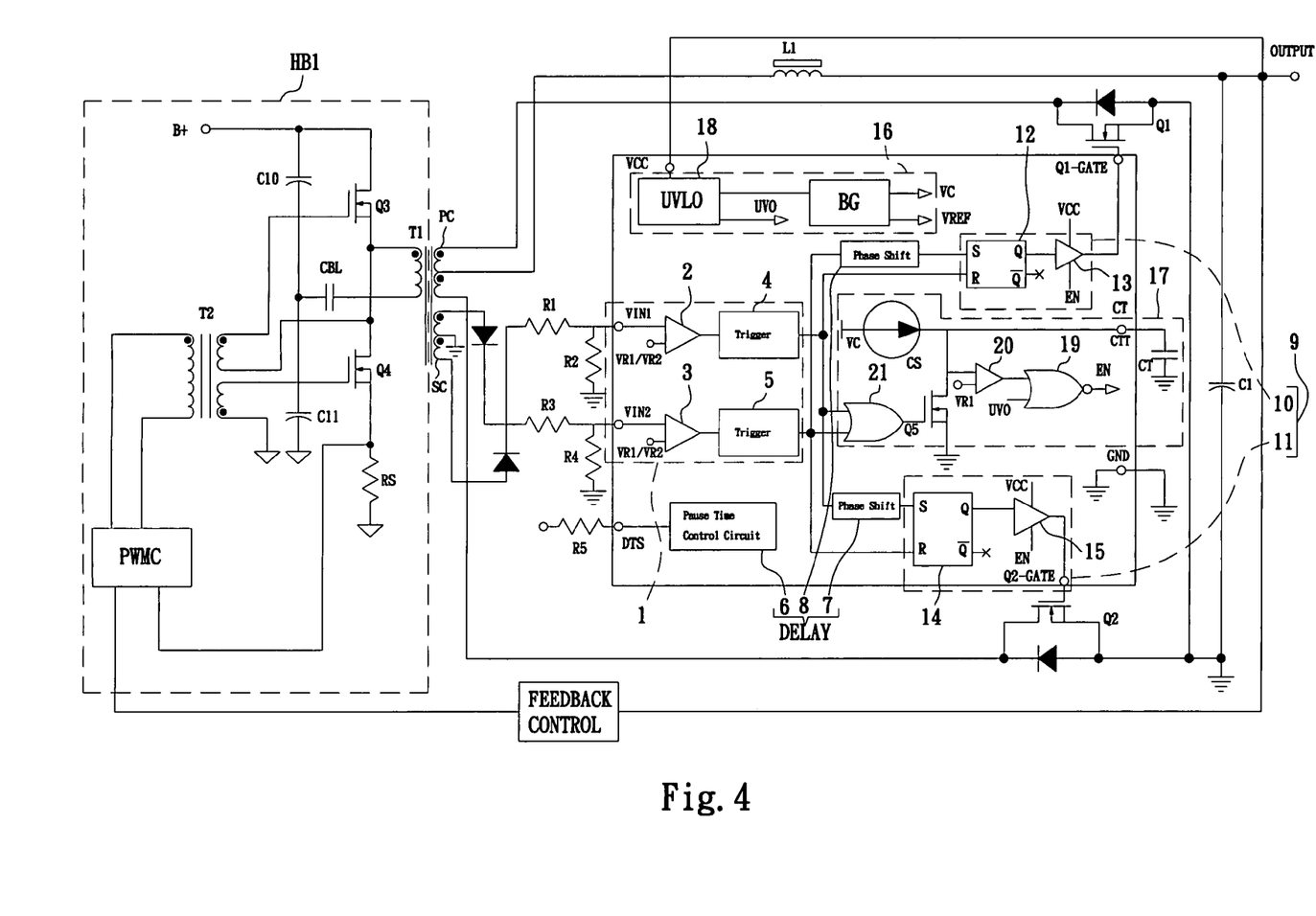
FIG. 4 is a schematic diagram of a synchronous rectifier control circuit used in a half-bridge circuit according to a second preferred embodiment of the present invention.

Referring to FIG. 4 for the schematic view of a synchronous rectifier control circuit used in a half-bridge circuit according to a second preferred embodiment of the invention, the synchronous rectifier control circuit installs a secondary wiring of the main transformer T1 of the half-bridge circuit. Compared with the first preferred embodiment as shown in FIG. 2, a plurality of secondary windings can be installed. For example, the two secondary windings including the power winding PC and the signal winding SC provides an induced voltage power and a first and a second input signals VIN1, VIN2.

Figure 5:
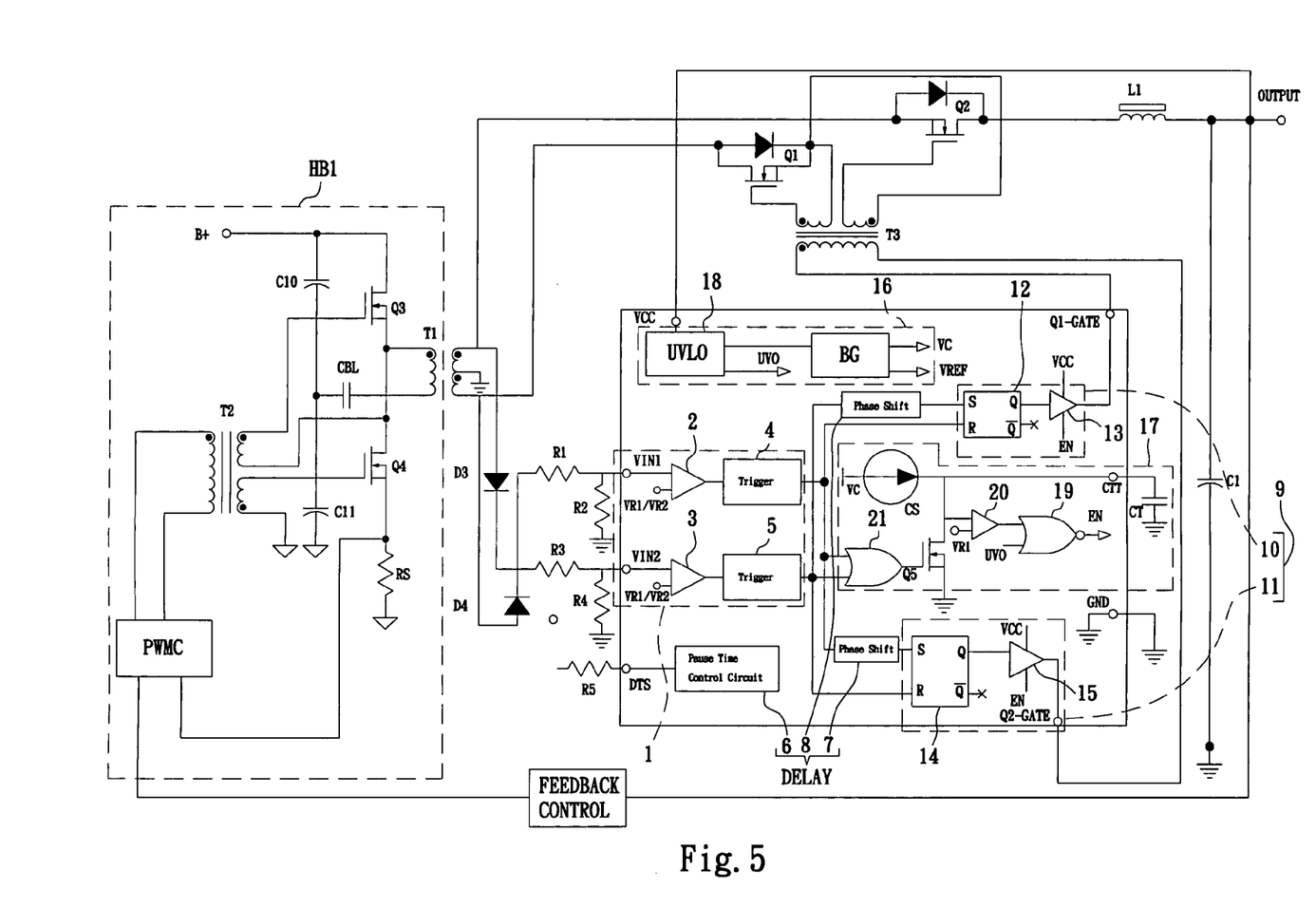
FIG. 5 is a schematic diagram of a synchronous rectifier control circuit used in a half-bridge circuit according to a third preferred embodiment of the present invention.

Referring to FIG. 5 for the schematic view of a rectifier control circuit used for a half-bridge circuit according to a third preferred embodiment of the present invention, the rectifier control circuit can control the current switches Q1, Q2 by a different method. In FIG. 5, the first and second switch signals outputted from the first and second switch signal units are passed through a driven transformer T3 to produce a voltage sufficient to drive the current switches Q1, Q2.

Referring to FIGS. 2, 4 and 5 for various half-bridge circuits of a synchronous rectifier control circuit of the foregoing preferred embodiment, only a current switch Q1 or Q2 can be used to substitute the rectifier diode D1 or D2 as shown in FIG. 1 to maintain the rectification. However, the use of the two current switches Q1, Q2 can provide a better performance for the energy conversion efficiency. The pause period DT adjusted by the delay unit DELAY is shorter than the fly wheeling time FW, and thus the effective operating time of the opened current switches Q1, Q2 can be increased to improve the energy conversion efficiency. Further, the current switch is a junction field effect transistor (JFET) or a metal oxide semiconductor field effect transistor (MOSFET) with a low impedance. The first and second switch signals are outputted to the gates of the current switches to control the electric connection of the current switch. The synchronous rectifier control circuit used in the half-bridge circuit according to the foregoing preferred embodiments is not restricted only to its use in a half-bridge circuit of the synchronous rectifier control circuit.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A synchronous rectifier control circuit comprising:

an input unit, for inputting a first input signal and a second input signal from a first input terminal and a second input terminal and producing a first trigger signal and a second trigger signal respectively;

a delay unit, for producing a first delay signal and a second delay signal according to said first trigger signal and said second trigger signal respectively;

a switch signal unit, for producing at least one switch signal to control said current switch, and a cycle of said each switch signal including a pause period, and said pause period starts when an instant pulse of said first trigger signal or said second trigger signal is sent to said switch signal unit and ends when the next instant pulse of said first delay signal or said second delay signal is sent to said switch signal unit, and said each switch signal turns off its controlled current switch in said pause period;

a power supply unit, for supplying an electric power for the operations of said switch signal unit and outputting at least one reference voltage;

a first limit voltage comparator of said first input terminal, a second limit voltage comparator of said second input terminal, a first trigger, and a second trigger, and said first trigger and said second trigger respectively use the signals of said first limit voltage comparator and said second limit voltage comparator to produce said first trigger signal and said second trigger signal; and a first switch section and a second switch section, and said first switch section includes a first flip-flop and a first gate driver, and said second switch section includes a second flip-flop and a second gate driver, and the first flip-flop outputs said first trigger signal and said second delay signal, and said first gate driver outputs a first switch signal of said at least one switch signal, and said second flip-flop outputs said second trigger signal and said first delay signal, and said second gate driver outputs a second switch signal of said at least one switch signal.

2. A synchronous rectifier control circuit, comprising:

an input unit, for inputting a first input signal from a first input terminal and a second input terminal and producing a first trigger signal and a second trigger signal respectively;

a delay unit, for producing a first delay signal and a second delay signal according to said first trigger signal and said second trigger signal respectively;

a switch signal unit, for producing at least one switch signal to control said current switch, and a cycle of said each switch signal including a pause period, and said pause period starts when an instant pulse of said first trigger signal or said second trigger signal is sent to said switch signal unit and ends when the next instant pulse of said first delay signal or said second delay signal is sent to said switch signal unit, and said each switch signal turns off its controlled current switch in said pause period;

a power supply unit, for supplying an electric power for the operations of said switch signal unit and outputting at least one reference voltage; and a first switch section and a second switch section, and said first switch section includes a first flip-flop and a first gate driver, and said second switch section includes a second flip-flop and a second gate driver, and the first flip-flop outputs said first trigger signal and said second delay signal, and said first gate driver outputs a first switch signal of said at least one switch signal, and said second flip-flop outputs said second trigger signal and said first delay signal, and said second gate driver outputs a second switch signal of said at least one switch signal.

3. The synchronous rectifier control circuit of claim 2, wherein said input unit further comprises:

a first limit voltage comparator of said first input terminal, a second limit voltage comparator of said second input terminal, a first trigger, and a second trigger, and said first trigger and said second trigger respectively use the signals of said first limit voltage comparator and said second limit voltage comparator to produce said first trigger signal and said second trigger signal.

4. The synchronous rectifier control circuit of claim 2, wherein said switch signal unit further comprises:

at least one switch section, and said each switch section includes an inverter and a gate driver, and said inverter inputs said first trigger signal and said second delay signal, or inputs said second trigger signal and said first delay signal, and said gate driver outputs one of said switch signals.

5. The synchronous rectifier control circuit of claim 2, wherein said delay unit further comprises:

a first phase shifter and a second phase shifter inputted to said first trigger signal and said second trigger signal for outputting said first delay signal and said second delay signal respectively.

6. The synchronous rectifier control circuit of claim 5, wherein said delay unit includes a pause time control circuit having a pause time control terminal.

7. The synchronous rectifier control circuit of claim 2, further comprising:

a protection circuit for interrupting the output of said switch signal unit according to an enable signal outputted by said first trigger signal and said second trigger signal and compulsorily turning off said all current switches.

8. The synchronous rectifier control circuit of claim 7, wherein said power supply unit outputs an under voltage lock out signal, and said protection circuit outputs said enable signal according to said under voltage lock out signal.

9. A synchronous rectifier control circuit, comprising:
an input unit, for inputting a first input signal and a second input signal from a first input terminal and a second input terminal and producing a first trigger signal and a second trigger signal respectively;
a delay unit, for producing a first delay signal and a second delay signal according to said first trigger signal and said second trigger signal respectively;
a switch signal unit, for producing at least one switch signal to control a current switch, and a cycle of each of said at least one switch signal including a pause period, and said pause period starts when an instant pulse of said first trigger signal or said second trigger signal is sent to said switch signal unit and ends when a next instant pulse of said first delay signal or said second delay signal is sent to said switch signal unit, and said each switch signal turns off a connected controlled current switch in said pause period;
a protection circuit for interrupting the output of said switch signal unit according to an enable signal outputted by said first trigger signal and said second trigger signal and compulsorily turning off all said current switches; and
a power supply unit, for supplying an electric power for the operations of said switch signal unit and outputting at least one reference voltage.

10. The synchronous rectifier control circuit of claim 9, wherein said input unit further comprises:
a first limit voltage comparator of said first input terminal, a second limit voltage comparator of said second input terminal, a first trigger, and a second trigger, and said first trigger and said second trigger respectively use a signal of said first limit voltage comparator and a signal of said second limit voltage comparator to produce said first trigger signal and said second trigger signal.

11. The synchronous rectifier control circuit of claim 9, wherein said switch signal unit further comprises:
at least one switch section, and wherein each of said at least one switch section includes an inverter and a gate driver, and said inverter inputs said first trigger signal and said second delay signal, or inputs said second trigger signal and said first delay signal, and said gate driver outputs one of aforementioned said signals.

12. The synchronous rectifier control circuit of claim 1 wherein said switch signal unit further comprises:
a first switch section and a second switch section, and said first switch section includes a first flip-flop and a first gate driver, and said second switch section includes a second flip-flop and a second gate driver, and the first flip-flop outputs said first trigger signal and said second delay signal, and said first gate driver outputs a first switch signal of said at least one switch signal, and said second flip-flop outputs said second trigger signal and said first delay signal, and said second gate driver outputs a second switch signal of said at least one switch signal.

13. The synchronous rectifier control circuit of claim 1, wherein said switch signal unit further comprises:
a first switch section and a second switch section, and said first switch section includes a first flip-flop and a first gate driver, and said second switch section includes a second flip-flop and a second gate driver, and the first flip-flop outputs said first trigger signal and said second delay signal, and said first gate driver outputs a first switch signal of said at least one switch signal, and said second flip-flop outputs said second trigger signal and said first delay signal, and said second gate driver outputs a second switch signal of said at least one switch signal.

14. The synchronous rectifier control circuit of claim 1, wherein said power supply unit outputs an under voltage lock out signal, and said protection circuit outputs said enable signal according to said under voltage lock out signal.

15. The synchronous rectifier control circuit of claim 14, wherein said switch signal unit further comprises:
a first switch section and a second switch section, and said first switch section includes a first flip-flop and a first gate driver, and said second switch section includes a second flip-flop and a second gate driver, and the first flip-flop outputs said first trigger signal and said second delay signal, and said first gate driver outputs a first switch signal of said at least one switch signal, and said second flip-flop outputs said second trigger signal and said first delay signal, and said second gate driver outputs a second switch signal of said at least one switch signal.

16. The synchronous rectifier control circuit of claim 9, wherein said delay unit further comprises:
a first phase shifter and a second phase shifter inputted to said first trigger signal and said second trigger signal for outputting said first delay signal and said second delay signal respectively.

17. The synchronous rectifier control circuit of claim 16, wherein said switch signal unit further comprises:
a first switch section and a second switch section, and said first switch section includes a first flip-flop and a first gate driver, and said second switch section includes a second flip-flop and a second gate driver, and the first flip-flop outputs said first trigger signal and said second delay signal, and said first gate driver outputs a first switch signal of said at least one switch signal, and said second flip-flop outputs said second trigger signal and said first delay signal, and said second gate driver outputs a second switch signal of said at least one switch signal.

18. The synchronous rectifier control circuit of claim 16, wherein said delay unit includes a pause time control circuit having a pause time control terminal.

19. The synchronous rectifier control circuit of claim 18, wherein said switch signal unit further comprises:
a first switch section and a second switch section, and said first switch section includes a first flip-flop and a first gate driver, and said second switch section includes a second flip-flop and a second gate driver, and the first flip-flop outputs said first trigger signal and said second delay signal, and said first gate driver outputs a first switch signal of said at least one switch signal, and said second flip-flop outputs said second trigger signal and said first delay signal, and said second gate driver outputs a second switch signal of said at least one switch signal.

* * * * *